(No Model.)
J. H. LUBBERS.
WINDOW GLASS LEER.
No. 427,882. Patented May 13, 1890.
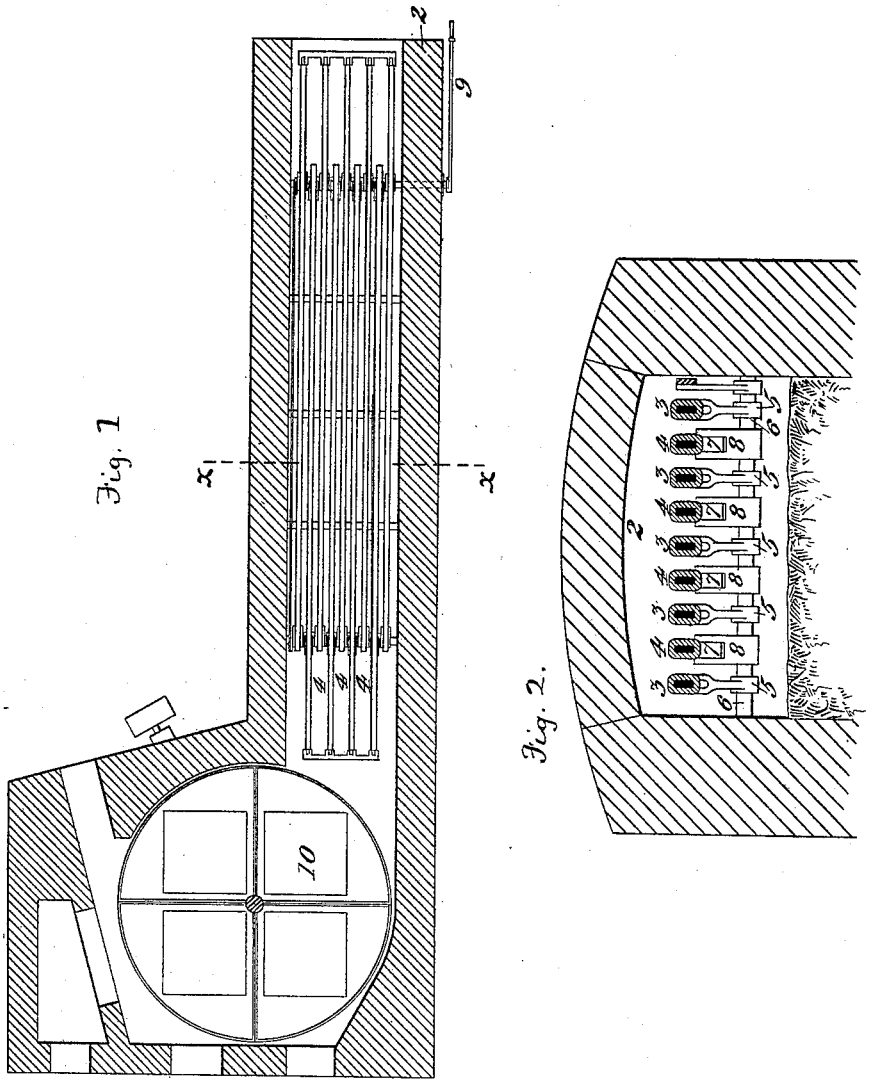
WITNESSES:
Paul Bakewell
James H Bakewell
INVENTOR,
John H. Lubbers
by Bakewell & Kerr
his Att'ys

UNITED STATES PATENT OFFICE.

JOHN H. LUBBERS, OF NEW CASTLE, PENNSYLVANIA.

WINDOW-GLASS LEER.

SPECIFICATION forming part of Letters Patent No. 427,882, dated May 13, 1890.

Application filed November 1, 1886. Renewed April 8, 1890. Serial No. 347,034. (No model.)

*To all whom it may concern:*

Be it known that I, JOHN H. LUBBERS, of New Castle, in the county of Lawrence and State of Pennsylvania, have invented a new and useful Improvement in Window-Glass Leers; and I do hereby declare the following to be a full, clear, and exact description thereof.

The object of my invention is to provide means for preventing scratching and shrending of window-glass as it is passed through leers in the annealing process, and for improving the quality of the product of the leer by rendering it more homogeneous.

In making window-glass it is the practice, after the glass cylinders or rollers have been opened and flattened in the flattening-oven, to pass them through a leer or tunnel which gradually diminishes in heat from one end to the other. The effect of this is to temper or anneal the glass. The glass is passed through the leer upon cars which carry thirty sheets of glass and upward, or it is sometimes conveyed through the leer by means of bars which have both a vertical and longitudinal movement. The glass rests on a support consisting either of brick or tile or of a second stationary set of bars, and it is moved forward by the movable bars, which normally lie in grooves or spaces beneath the level of the rests. The movable bars are elevated, so as to lift the glass from the rests, and are then moved forward a little, so as to advance the glass, and are finally lowered to deposit the glass again upon the fixed rests. The movable bars are then moved back again in the leer to be in readiness for another lift and advance of the glass. The contact of the sheets of glass with the metal frame-work of the cars and with the fixed rests and movable bars is apt to scratch the glass, and sometimes, by reason of the fact that the tile and metal conduct heat very rapidly, the glass is subjected to unequal heat, and is therefore annealed improperly, and is apt to shrend or crack. I have discovered that this may be prevented by facing so much of the car frame or bars and tile as comes in contact with the sheets of glass with asbestus. This material is soft and non-combustible, and is comparatively a poor conductor of heat, so that its contact will not injuriously affect the glass. The asbestus may be applied in any suitable manner, either by rivets or metal straps, or otherwise, as the person applying it may deem best. I have reduced my invention to actual practice, and find that its use results in a saving of glass and in the production of glass of better quality, because it is free from scratches and is better annealed.

An important advantage in the application of my invention to car-leers is that it enables the cars to be used for transporting glass without first heating them, as has heretofore been the practice, in order to raise the temperature of the car to or approximately to that of the glass. Asbestus, being a poor conductor of heat, will not crack the glass, even if it is lower in temperature, and the preliminary heating of the car may therefore be dispensed with.

I deem pads or felts of mineral wool to be equivalents of asbestus for the purpose which I have described.

I do not desire to limit myself to any particular mode of attaching the asbestus, nor do I limit myself to the application of the asbestus to all the parts of the transporting apparatus, since, if desired, some parts may be covered with asbestus and other parts left uncovered, it being only necessary that the asbestus be applied in a sufficient number of places to make a bearing for the glass and to keep it from contact with the iron.

For the purpose of illustrating my invention I show in the accompanying drawings a glass-leer having bars for transporting the glass, these bars being faced with asbestus.

Figure 1 is a horizontal longitudinal section through a glass-leer and annealing-oven, showing the bars and the flattening-stone in plan view. Fig. 2 is a vertical cross-section on the line $x\ x$ of Fig. 1.

Like symbols of reference indicate like parts in each.

In the drawings, 2 represents the leer or tunnel, and 3 and 4 are the sets of bars arranged therein for the transportation of the glass sheets. They are of a well-known kind and need no detailed explanation. It is sufficient to say that the bars 3 are secured to cranks or levers 5, which extend upward from horizontally and transversely journaled shafts 6. The bars 4 are mounted on friction-rollers 7, which are journaled at the ends of other projecting levers 8. The levers 5 and 8 project from the shafts 6 at different angles, as shown in Fig. 1, so that when these shafts are turned the arc described by one set of levers 5 will be upward and that of the levers 8 will be downward, and the sets of bars will therefore move in opposite vertical directions.

9 is a hand-lever for operating the bars. As shown in Fig. 2 by the peripheral hatched portion, the bars (which are shown in solid black) are covered with asbestos. To move the glass through the leer, the sheets are lifted from the flattening-stone 10 and are placed on the set of bars 4. The lever 9 is then turned to elevate the bars 4 and to depress the bars 3. The bars 4 are then pulled forward to bring the glass over the bars 3, and the lever 9 is then reversed, so as to lower the bars 4 below the level of the bars 3 and to deposit the glass on the latter bars. The bars 4 are then moved back to receive another sheet of glass, and at each of these operations, as above described, the successive sheets of glass are moved forward through the leer and are annealed by its gradually-lowering temperature.

Now it is clear that the bars for transporting the glass, when made of metal, are subject to reduction of temperature by conduction from cooler parts of the leer, so that that portion of the glass which rests on the bars may be colder than the remainder of the sheet, which is in contact with the air only. The result is often an imperfectly-annealed sheet of uneven composition. The same thing is incident to the use of the car-leer. To prevent this is the purpose of my invention. By keeping the glass in contact with asbestus covered supports irregularity of temperature is to a very large degree prevented, and the glass is made to cool as slowly at those parts where it is exposed to the supports as at the parts where it is in contact only with the air of the leer. It also prevents scratching of the glass, as before described.

I am aware that in Patent No. 275,130, dated April 3, 1883, there is described a "carrying-in fork" whose tines are covered with asbestus. These forks are used to carry small glass articles—such as goblets, &c.—from the molds to the annealing-furnace, and the asbestus is used to prevent rapid conduction of heat from the glass by the metal fork. These forks, however, are not at all used in the annealing of glass and differ from my improvement, because the asbestus-faced bars or cars are situated in the leer and exposed to the heat thereof. The result of the use of my improvement is the production of a more finely annealed article than is practicable with the use of the uncovered bars or cars heretofore used. The results of the use of the said forks and of the asbestus-covered transporting mechanism for leers are therefore altogether different.

I claim as my invention—

In an annealing-leer for annealing window-glass, the mechanism, substantially as described, for transporting the glass through the leer, said mechanism being faced with asbestus, substantially as and for the purposes described.

In testimony whereof I have hereunto set my hand this 29th day of October, A. D. 1886.

JOHN H. LUBBERS.

Witnesses:
W. B. CORWIN,
THOMAS W. BAKEWELL.